United States Patent [19]

Viger

[11] 4,197,076
[45] Apr. 8, 1980

[54] FORCED DRAFT BURNER

[75] Inventor: Stanley F. Viger, Vancouver, Canada

[73] Assignee: Pacific Turbo Flame Ltd., Vancouver, Canada

[21] Appl. No.: 877,204

[22] Filed: Feb. 13, 1978

[51] Int. Cl.² ............................................. F23M 9/00
[52] U.S. Cl. ................................... 431/284; 431/183; 239/406; 239/402
[58] Field of Search ............... 431/265, 284, 285, 174, 431/182, 183, 353; 239/402, 405, 406

[56] References Cited

U.S. PATENT DOCUMENTS

| | | | |
|---|---|---|---|
| 2,433,317 | 12/1947 | Carter | 239/406 |
| 2,505,336 | 4/1950 | Murphy | 239/405 |
| 2,634,806 | 4/1953 | Hirtz | 239/406 |
| 2,976,919 | 3/1961 | Sanborn | 431/265 |
| 3,049,173 | 8/1962 | Costello et al. | 431/284 |
| 3,074,361 | 1/1963 | Huge et al. | 431/284 |
| 3,180,395 | 4/1965 | Reed | 431/285 |
| 3,240,433 | 3/1966 | Keating | 239/405 |
| 3,529,915 | 9/1970 | Tsuji et al. | 431/284 |
| 3,733,169 | 5/1973 | Lefebvre | 431/265 |
| 4,120,640 | 10/1978 | Martin | 431/353 |

FOREIGN PATENT DOCUMENTS

| | | | |
|---|---|---|---|
| 220275 | 8/1961 | Austria | 431/183 |
| 1292721 | 10/1972 | United Kingdom | 239/406 |
| 1465689 | 2/1977 | United Kingdom | 431/174 |
| 264588 | 3/1970 | U.S.S.R. | 431/174 |

Primary Examiner—Carroll B. Dority, Jr.
Assistant Examiner—Lee E. Barrett
Attorney, Agent, or Firm—Townsend and Townsend

[57] ABSTRACT

A forced draft burner unit comprises: a flame chamber, a conduit for conducting fuel to the flame chamber, a blast tube for conducting air from an air opening adjacent a first end of the blast tube to a second end of the blast tube adjacent the flame chamber; and a fan for supplying pressurized air to the air opening so the pressurized air enters the air opening generally tangential to the blast tube and passes along the blast tube to the second end in vortical flow; and vanes for mixing the fuel and air in the flame chamber.

13 Claims, 7 Drawing Figures

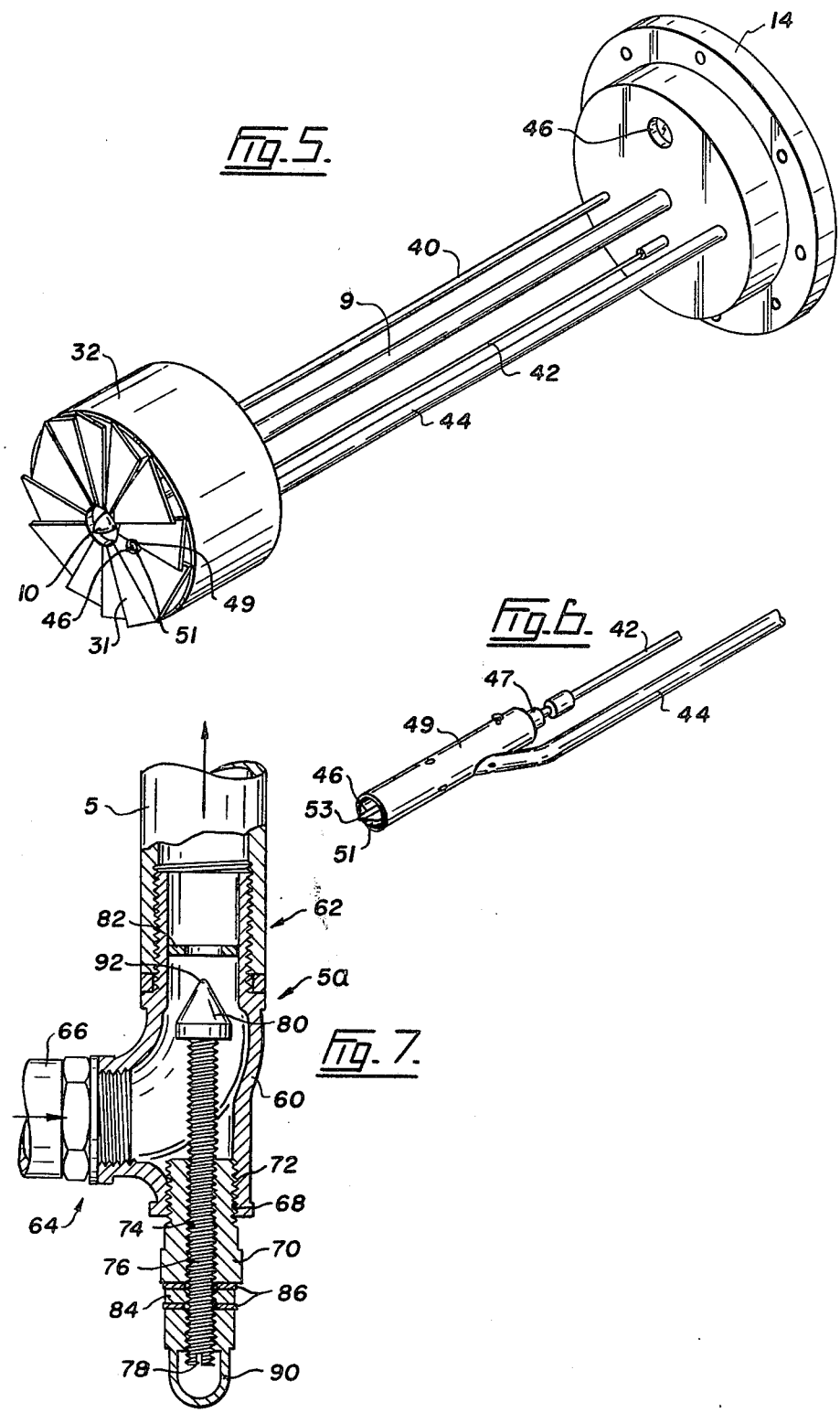

4,197,076

FORCED DRAFT BURNER

BACKGROUND OF THE INVENTION

1. Field of the Invention

This invention relates to a forced draft burner.

2. Discussion of Prior Art

Burner units of the forced draft type for combustion of fuels, such a natural gas and oil, are known. However, the design of some burners has allowed pockets of gas to pass up the flue and thereby contribute to the possibility of an explosion. Additionally, some previous burner units have been quite bulky, a disadvantage especially in installing such burner units in existing locations.

SUMMARY OF THE INVENTION

According to this invention, there is provided a forced draft burner unit comprising: a flame chamber; conduit means for conducting fuel to the flame chamber; blast tube means for conducting air from an air opening adjacent a first end of the blast tube to a second end of the blast tube adjacent the flame chamber; and a fan for supplying pressurized air to the air opening so that pressurized air enters the air opening generally tangential to the blast tube and passes along the longitudinal axis to the second end in vortical flow; and means for mixing the fuel and air in the flame chamber.

For example, the blast tube means comprises a generally cylindrical blast tube and the air opening is on a side of the blast tube.

In a preferred form, the fan has an impeller with an axis of rotation generally parallel to the longitudinal axis of the blast tube. Preferably, the impeller has impeller blades, an outer portion of the blades passing within the blast tube as the impeller rotates.

The forced air burner unit, according to the present invention, is a relatively compact unit when compared with some prior art burner units. A 1,500,000 BTU unit is only approximately 17" deep including the flame chamber. Further, the vortical flow of the air through the blast tube and into the flame chamber provides for more thorough mixing of the fuel and air when compared with some previous burner units. The improved mixing of fuel and air reduces the possibility of pockets of unburned fuel causing explosions in the system.

BRIEF DESCRIPTION OF THE DRAWINGS

FIG. 5 is a perspective view of a portion of the invention showing the burner end plate, and blast tube vanes;

FIG. 6 is a perspective view of a gas pilot ignition tube.

FIG. 7 is a sectional elevational view of a gas rate of fire valve, taken along section 7—7 of FIG. 2.

DESCRIPTION OF THE PREFERRED EMBODIMENT

Figure 1:
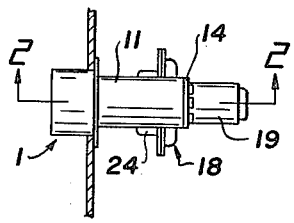
FIG. 1 is a plan view of a forced air burner unit according to an embodiment of the invention.
Figure 2:
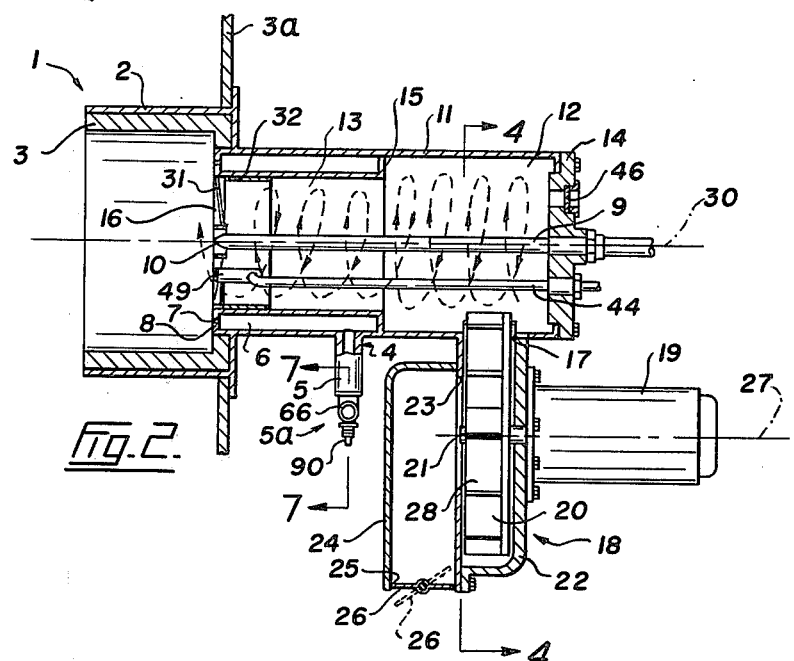
FIG. 2 is a partly sectional side elevational view of the embodiment of the invention shown in FIG. 1.

A preferred embodiment of the invention is illustrated in FIGS. 1 to 6. The general configuration of the forced air burner unit is best seen in FIG. 2. Combustion of a fuel and air mixture takes place in an open-ended cylindrical flame chamber 1 consisting of a cylindrical outer shell 2 lined with a refractory material 3 such as refractory brick. A flange 3a is connected to one end of the flame chamber 1. The burner unit also has conduits for conducting fuel to the flame cone. The gas conduit 4, for natural gas or the like, consists of an inlet pipe 5, from a source of combustible gas, connected to a rate of fire valve 5a, which is connected to the bottom of annular conduit 6. Annular conduit 6 has a slot 7 in the end wall 8, communicating with open end 16 of the flame chamber 1. The combustible gas passes from the inlet pipe 5 and rate of fire valve 5a, through annular conduit 6, and through circular slot 7 to the flame chamber 1. The burner unit also has a conduit for oil consisting of oil tube 9 passing along the centre of blast tube 11 which brings oil from an outside source, not shown, and spray head 10, connected to oil tube 9 adjacent open end 16 of flame chamber 1. Spray head 10 is for spraying oil into the flame chamber 1.

Air is brought into the flame chamber 1 by means of blast tube 11. The blast tube 11 consists of two colinear tubular sections 12 and 13 having circular cross sections. Section 12 extends from a end plate 14 of the blast tube 11 to annular plate 15 generally half way between end plate 14 and the open end 16 of the flame chamber 1. Plate 15 forms the back wall of annular conduit 6. The second section 13 of the blast tube 11 has a smaller cross sectional diameter than the first section 12 of the blast tube. The annular conduit 6 surrounds the second section 13 of the blast tube. The outside diameter of the annular conduit 6 is generally the same as the outside diameter of the first portion 12 of the blast tube 11. The blast tube 11 conducts air from an air opening 17, on the side of blast tube 11 adjacent the end plate 14, to the open end 16 of the flame chamber 1.

Figures 3, 4:
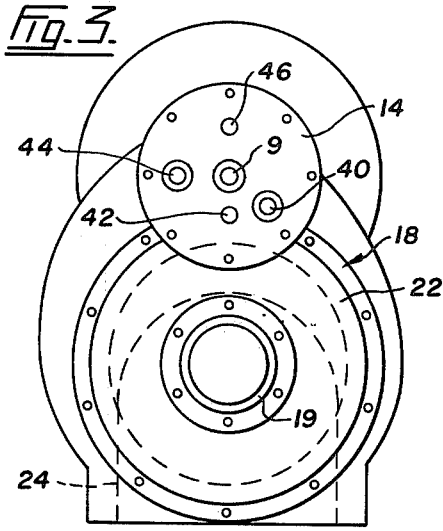
FIG. 3 is an end elevational view of the embodiment of the invention shown in FIG. 1.
FIG. 4 is a view along section 4—4 of FIG. 2.

Impeller-type fan 18 located below blast tube 11 supplies pressurized air to the air opening 17. The fan 18 has an electric motor 19 directly connected to an impeller 20 by shaft 21. A shroud 22 encloses impeller 20 except for an opening 23 opposite motor 19. Air scoop 24 covers opening 23 and has an air intake opening 25 with adjustable damper 26 near the bottom thereof. The axis of rotation 27 of the fan 18 is generally parallel to the longitudinal axis 30 of the blast tube 11. The blades 28 of impeller 21 pass within a portion 29 of the blast tube 11, as best seen in FIG. 4. Consequently, the pressurized air from the fan 18 enters the fan opening 17 in a direction tangential to the blast tube 12, as shown by the arrows in FIG. 4. The air passes along the longitudinal axis 30 of the blast tube 11 towards open end 16 of flame chamber 1 in vortical flow, as indicated by the arrows in FIG. 2.

This embodiment of the invention also has a set of vanes 31 best seen in FIG. 5, located on the end of the blast tube 11 adjacent the open end 16 of the flame chamber 1 and cylindrical sleeve 32, for mixing the fuel and air in the flame chamber 1. The air passing through blast tube 11 is directed radially outwards by vanes 31 while maintaining the vortical flow. The vanes 31 improve combustion of the air and fuel by thoroughly mixing the air and fuel in the flame chamber 1. The temperature of the air and fuel increases to about 900° C. in flame chamber 1. The air and fuel emerge into a hot spot (not shown) and there is almost complete combustion instantaneously.

As best seen in FIG. 5, back plate 14, with glass covered sight hole 46, is connected to vanes 31, with attached cylindrical sleeve 32, by means of oil tube 9, ultraviolet tube 40, ignition cable 42, and gas pilot tube 44. An ultraviolet sensing device (not shown) is placed adjacent tube 40 and plate 14, outside blast tube 11, for determining whether or not combustion is taking place. As seen in FIG. 6, ignition cable 42 is connected to the centre electrode 46 of spark plug 47 within tube section 49 of gas pilot tube 44. Tube section 49 is attached to gas pilot tube 44 adjacent vanes 31. A second electrode 51 is attached to the side of tube section 49 forming a gap 53 with electrode 46 adjacent vanes 31. In order to ignite oil sprayed from spray head 10, gas is passed through gas pilot tube 44 and a spark made at gap 53 by applying a voltage to ignition cable 42. The spark ignites the gas and the burning gas ignites the oil.

FIG. 7 illustrates the gas ratio of fire valve 5a as shown in FIG. 2. Valve 5a has an elbow-shaped body portion 60 with threaded couplings 62 and 64 for the inlet pipe 5, as shown in FIG. 2, and pipe 66 from the gas source. Body portion 60 has a threaded opening 68 aligned with inlet pipe 5. Hexagonal bushing 70 has exterior threads 72 for screwing the bushing 70 into opening 68 of body portion 60 and an interior threaded aperture 74 for receiving a threaded steel rod 76. Rod 76 has a slot 78 at the end distal inlet pipe 5 and a limiting flow disc 80 is attached to the end of rod 76 proximal inlet pipe 5. An orifice plate 82 is located within body portion 60 of valve 5a between the limiting flow disc 80 and inlet pipe 5. Seal nut 84 with a pair of copper washers 86, and a seal cap 90 are threaded onto the end of rod 76 opposite limiting flow disc 80 to prevent the leakage of gas from valve 5a. In order to adjust the valve 5a, the seal cap 90 is removed and a screw driver is inserted in slot 78. Clockwise turning of rod 76 moves apex 92 of limiting flow disc 80 towards orifice 82 and reduces the flow of gas through inlet pipe 5. Counter-clockwise turning of rod 76 moves apex 92 of limiting flow disc 80 away from orifice plate 82 and increases the flow of gas through inlet pipe 5.

What I claim is:

1. A forced draft burner unit comprising:
   a flame chamber;
   conduit means for conducting fuel to the flame chamber;
   a blast tube for conducting air, from an air opening on a side of the tube adjacent a first end of the blast tube, and along a longitudinal axis thereof, to a second end of the blast tube adjacent the flame chamber;
   an impeller-type centrifugal fan for supplying pressurized air to the air opening, the fan having an axis of rotation parallel to the longitudinal axis of the blast tube and having impeller blades, with outer portions passing within the blast tube as the fan rotates, so the pressurized air enters the air opening in a direction generally tangential to the blast tube and passes along the longitudinal axis to the second end in vortical flow; and
   means for mixing the fuel and air in the flame chamber.

2. A burner unit as claimed in claim 1, wherein: the means for mixing the fuel and air comprises a vane means at the end of the blast tube for directing air passing through the blast tube radially outwards.

3. A burner unit as claimed in claim 2, wherein the conduit means includes means for conducting combustible gas into the air directed radially outwards by the vane means.

4. A burner unit as claimed in claim 3, wherein the conduit means conducts the gas to points spaced radially outwards from the second end of the blast tube.

5. A burner unit as claimed in claim 2, the conduit means including a continuous slot radially spaced about the second end of the blast tube for conducting gas into the air directed radially outwards by the vane means.

6. A burner unit as claimed in claim 2, wherein the conduit means includes:
   means for conducting oil to the centre of the blast tube at the second end of the blast tube; and
   a spray head for spraying the oil into the flame chamber to mix with air directed radially outwards by the vane means.

7. A burner unit as claimed in claim 1, wherein the blast tube comprises two colinear cylindrical sections, a first section extending from the first end of the blast tube generally half way to the second end of the blast tube and a second section extending from the first section to the second end of the blast tube; the second section having a smaller diameter than the first section.

8. A burner unit as claimed in claim 7, the conduit including means for conducting gas to the flame chamber including an annular conduit surrounding the second section of the blast tube for conducting gas to points spaced radially outwardly from the second end of the blast tube, the annular conduit having an outside diameter generally the same diameter as outside diameter of the first portion of the blast tube.

9. A burner unit as claimed in claim 1, wherein the fan is located below the blast tube when the burner is in position for use.

10. A burner unit as claimed in claim 1, wherein the flame chamber comprises a tube with a circular cross section having an inside diameter greater than the outside diameter of the blast tube at the second end of the blast tube.

11. A forced draft burner unit comprising:
    an open-ended cylindrical flame chamber;
    a cylindrical blast tube closed at a first end and communicating concentrically with a first open end of the flame chamber at a second end, the blast tube conducting air, from an air opening on a side of the blast tube adjacent the first end, to the first end of the flame chamber;
    an impeller-type fan for supplying pressurized air to the air opening in a direction tangential to the blast tube so the air passes through the blast tube to the flame chamber in vortical flow, the impeller having an axis of rotation generally parallel to the blast tube and having impeller blades with outer portions passing within the blast tube as the fan rotates, and being located below the blast tube and adjacent the first end thereof, when the burner unit is in position for use;
    a conduit for supplying fuel to the flame chamber adjacent the second end of the blast tube; and
    a set of vanes circularly arranged about the second end of the blast tube for mixing the fuel and air entering the flame chamber.

12. A burner unit as claimed in claim 11, wherein the conduit comprises an annular chamber surrounding the blast tube adjacent the second end thereof;
    an inlet pipe communicating with the annular chamber on an outside wall thereof;
    and a circular slot on an end of the annular chamber adjacent the one open end of the flame chamber and surrounding the second end of the blast tube.

13. A burner unit as claimed in claim 11, wherein the conduit comprises an oil tube passing through the blast tube concentrically therewith; and a spray head attached to an end of the oil tube adjacent the first open end of the flame chamber.

* * * * *